March 16, 1943.  W. JOHNSON  2,314,045
MEANS TO PROTECT LAWNS AND FIELDS
Filed March 19, 1941  2 Sheets-Sheet 1
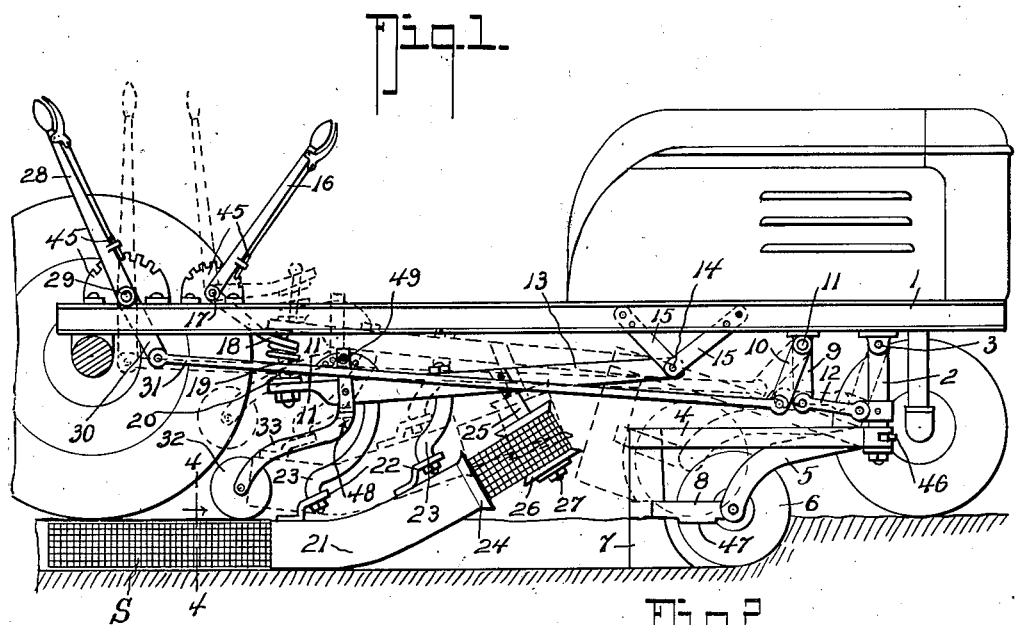
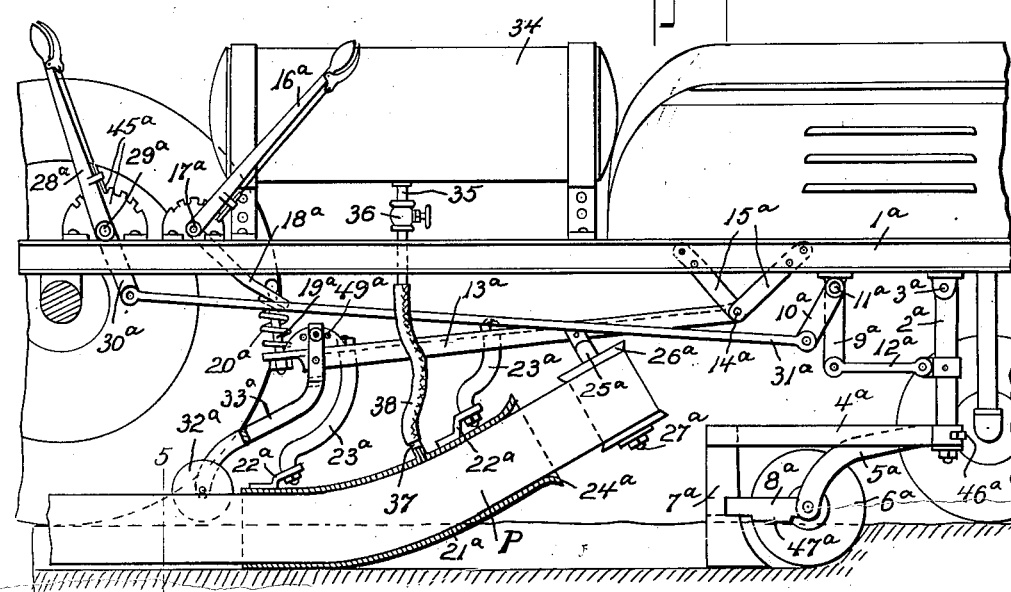
Inventor
William Johnson
By Albert E. Dieterich
Attorney

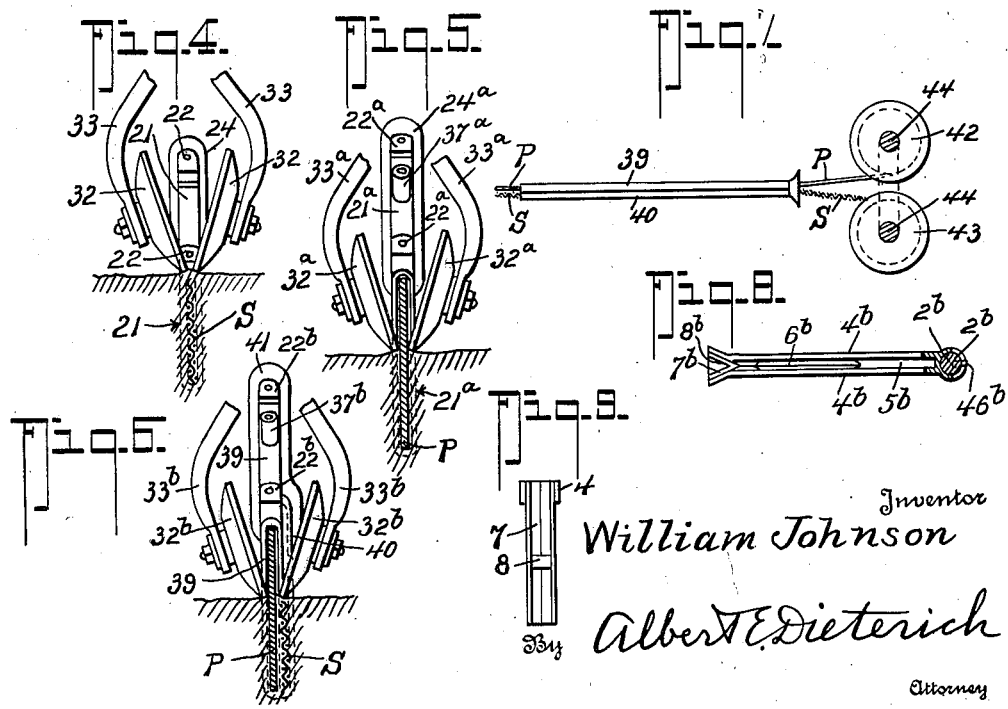

Patented Mar. 16, 1943

2,314,045

UNITED STATES PATENT OFFICE 2,314,045

MEANS TO PROTECT LAWNS AND FIELDS

William Johnson, Council Bluffs, Iowa

Application March 19, 1941, Serial No. 384,187

10 Claims. (Cl. 111—5)

My invention has for an object to provide an improved means for stopping or preventing the work of moles in both lawns and fields and also to provide means to prevent the spreading of chinch bugs onto neighboring lawns or fields.

More specifically, the invention has for its object to provide a machine for the laying of barriers in a lawn or field through or beyond which moles and/or chinch bugs can not pass.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a side elevation illustrating my invention as applied to a tractor of any suitable kind (the near wheels of the vehicle being omitted to show the invention more clearly).

Fig. 2 is a view similar to Fig. 1 of another embodiment of the invention.

Fig. 3 is a view similar to Figs. 1 and 2 of a third embodiment of the same.

Fig. 4 is an enlarged detail section on line 4—4 of Fig. 1.

Fig. 5 is an enlarged detail section on line 5—5 of Fig. 2.

Fig. 6 is an enlarged detail section on line 6—6 of Fig. 3.

Fig. 7 is a detail developed top plan view of the combined paper and screen laying tube of Fig. 3, Fig. 8 is a detail plan view on line 8—8 of Fig. 3.

Fig. 9 is a detail rear view of the assembly shown in Fig. 8.

Fig. 10 is an enlarged front elevation of the tube shown in Fig. 7.

Fig. 11 is an enlarged detail cross section on line 11—11 of Fig. 2.

The drawings are but illustrations, and not scale drawings. They are to be read in connection with this specification, like numbers and letters of reference designating like parts in all the figures.

The apparatus which comprises my invention may be mounted on any suitably constructed wheeled vehicle (a tractor being indicated in the drawings) having a frame 1.

Suitably mounted on the frame 1 is an arm 2 which is pivoted at 3 and to which the longitudinal bars 4 that help to carry a spreader 7 are mounted to turn on the axis of the arm 2, the turning movement being limited by a pin and slot connection 46 to prevent the cutter wheel from turning completely around the axis of the arm 2 when not in the ground. Other arms 5, also secured to the arm 2, carry a ground splitting or slitting disc 6; braces 8 connecting the spreader 7 with the arms 5 serve to cooperate with the spreader-carrying arms 4 to hold the spreader in fixed relation to the disc 6 to follow close behind the same. The braces 8 have their lower edges bent inwardly toward the disc 6 as at 47 to act as disc scrapers for clearing the discs of dirt.

A rock shaft 11 is mounted on the frame 1. To this shaft are connected two levers 9 and 10, the lever 9 being linked at 12 to a collar clamped or pinned to the arm 2. The other lever 10 is joined to a lever 30 on a shaft 29 (to which an operating lever 28 is also secured) by a connecting rod 31.

A supporting bar 13 is pivoted at its front end, at 14, to bracket elements 15 secured to the frame 1. At its rear end the bar 13 is joined by a bolt and buffer spring connection 19, 20 to an arm 18 on a shaft 17 to which a second operating lever 16 is secured. The levers 28 and 16 (it should be mentioned in passing) are held in their different positions by the usual rack and latch devices 45.

The drawings illustrate three embodiments of my invention, the first (Fig. 1) being for the laying of a screen strip for mole prevention, the second (Fig. 2) for laying a tar paper strip for chinch bug control, and the third (Fig. 3) for laying both a tar paper chinch bug barrier and a wire screen mole barrier simultaneously.

In the embodiment of Fig. 1, a thin flat metal tube 21 of a size to allow easy passage of the strip of wire screening S is mounted on the bar 13 by means of lugs 22 and bracket arms 23, the tube 21 having a flared or bell-mouthed opening 24 to facilitate entry of the screen strip. The connections between the arms 23 and the lugs 22 and between the arms 23 and the supporting bar 13 are swivel connections in order that when the machine is operated in a zig-zag course or around corners the tube 21 will follow the opening in the ground without breaking the continuity of the wire or paper barrier which is being laid.

On a suitably positioned support 25 attached to bar 13 is a wire-carrying spool 26 which is removably held in place by a nut 27 and rotates freely on support 25.

At the rear of the tube 21 are mounted on supporting arms 33—attached to bar 13—a pair of flat-rimmed wheels 32 arranged at an angle to press the crevice together over the top of the wire or, in the case of installing the tar paper chinch-bug barrier, the wheels are adjusted to roll on the ground on each side of the tar paper at an angle and serve to pack the soil against each side of the tar paper and also to govern the depth to which the paper is placed in the ground as these wheels follow the surface.

Supporting arms 33 are pivoted or swiveled at 48 so that the two pack wheels 32 will follow directly behind the tube 21 when the machine is operated in a zig-zag course or around corners. Each supporting arm 33 is mounted on the bar 13, an adjustable ratchet device 49 being provided to allow for adjustments according to the depth to which the tube 21 is desired to be run in the ground.

As the vehicle travels over the lawn or field to be protected and the levers 16 and 28 are placed in their operative positions (full lines, Fig. 1) the slitting disc 6 will cut a slit in the ground, which slit is immediately widened by spreader 7 to provide a groove of proper depth and width to receive the lower rear end of the tube 21. The wire screen is fed through the tube 21 and its end held or staked in place. Forward movement of the vehicle then causes the wire S to be drawn through the tube 21 and laid in the groove. When the machine is to be used as a chinch-bug barrier laying machine, the second embodiment (Fig. 2) is used. In this embodiment a higher tube 21ª is used and a paper-strip-carrying spool 26ª is employed.

A tank 34 to contain a fluid, such as creosote, for example, is mounted on the frame 1ª. A rigid pipe 35 having a shut-off valve 36 conveys the fluid to a flexible pipe or hose connection 38 which is connected to a nipple 37 on the tube 21ª for delivering the fluid on the tar paper P as it is drawn through the tube to saturate the paper with the fluid. If desired, the embodiment of Fig. 2 may be used to lay wire screen by simply changing tube 21ª for a small tube such as 21 and mounting a wire-carrying spool on the support 25ª in place of the paper-carrying spool 26ª.

It may at times be desirable to lay a mole barrier and a chinch-bug barrier at the same places and, in that event, the third embodiment (Fig. 3), which is in reality a combination of the first two embodiments, may be employed. This is done by substituting for the tube 21ª in Fig. 2 a duplex tube 39, 40 (Fig. 3), one part of which is designed to lay the paper strip and the other part of which is designed to lay the wire strip.

A double spool carrier 44 is secured to the bar 13ᵇ in place of the single one 25ª in Fig. 2, and a slightly wider spreader 70 is used.

The tube 39, 40 has two channels (see Fig. 10) whose entrant ends are flared as at 41.

When transporting the vehicle to and from the place or places where it is to be used the lever 28 is pushed forward. This raises the slitter and spreader, as shown in dotted lines in Fig. 1. The barrier-laying tube is similarly raised above the ground by pulling back the lever 16ᵇ, as indicated in dotted lines in Fig. 1.

The mole barrier S is laid, preferably, entirely beneath the surface of the ground, while the chinch-bug barrier P is laid partly below and partly above the surface (see Fig. 2), usually about five inches of the creosote-soaked tar paper projecting above the surface of the ground.

The levers 16 and 28 also allow one to adjust the depth to which the opening in the ground is made.

In Figs. 2 and 3 those parts which are of essentially the same construction, and which perform the same function as similar parts in Fig. 1, bear the same reference numeral plus the index letter *a* (Fig. 2) or *b* (Fig. 3) as the case may be.

From the foregoing description, taken in connection with the accompanying drawings, it is thought that the construction, operation and advantages of my invention will readily appear to those skilled in the art, and I wish it understood that changes in the details, proportions and arrangements of parts may be made within the scope of the invention and the appended claims.

What I claim is:

1. In a machine of the character described, a wheeled vehicle having a frame, a ground slitting disc and a spreader carrying frame pivotally mounted on said vehicle frame, lever operated means mounted on the vehicle and connected with said carrying frame for swinging it on its pivot, means to the rear of said spreader for laying edgewise in the ground opening a barrier strip, means to the rear of the strip laying means for pressing the dirt to seal-in the barrier, a bar one end of which is pivotally supported by the vehicle frame, and a lever device on the vehicle and connected with the other end of said bar for rocking it on its pivot, said laying means and said sealing-in means being carried by said bar.

2. In a machine of the character described, a wheeled vehicle having a frame, a ground slitting disc and a spreader carrying frame pivotally mounted on said vehicle frame, lever operated means mounted on the vehicle and connected with said carrying frame for swinging it on its pivot, means to the rear of said spreader for laying edgewise in the ground opening a barrier strip, a tank for fluid mounted on the vehicle, said laying means including a flat tube having a nipple in its upper edge, and a connection between said tank and said nipple for leading the fluid from said tank into said tube.

3. In a machine of the character described, a wheeled vehicle having a frame, a ground slitting disc and a spreader carrying frame pivotally mounted on said vehicle frame, lever operated means mounted on the vehicle and connected with said carrying frame for swinging it on its pivot, means to the rear of said spreader for laying edgewise in the ground opening a barrier strip, means to the rear of the strip laying means for pressing the dirt to seal-in the barrier, a tank for fluid mounted on the vehicle, said laying means including a flat tube having a nipple in its upper edge, and a connection between said tank and said nipple for leading the fluid from said tank into said tube.

4. In a machine of the character described, a wheeled vehicle having a frame, a ground slitting disc and a spreader carrying frame pivotally mounted on said vehicle frame, lever operated means mounted on the vehicle and connected with said carrying frame for swinging it on its pivot, means to the rear of said spreader for laying edgewise in the ground opening a barrier strip, means to the rear of the strip laying means for pressing the dirt to seal-in the barrier, a bar one end of which is pivotally supported by the vehicle frame, and a lever device on the vehicle and connected with the other end of said bar for rocking it on its pivot, said laying means and said sealing-in means being carried by said bar, a tank for fluid mounted on the vehicle, said laying means including a flat tube having a nipple in its upper edge, and a connection between said tank and said nipple for leading the fluid from said tank into said tube.

5. In a barrier laying machine, a wheeled vehicle, a longitudinally disposed bar pivotally supported at one end by and beneath said vehicle, a control lever on the vehicle operatively connected with the other end of said bar to raise and lower the same, a flat tube mounted beneath and to said bar to enter the ground edgewise, a spool carrier supported on said bar in front of said tube, a ground sealer carried by said bar to the rear of said tube, and means to open a furrow in the ground in advance of and to receive the rear portion of said tube.

6. In a barrier laying machine, a wheeled vehicle, a longitudinally disposed bar pivotally supported at one end by and beneath said vehicle, a control lever on the vehicle operatively connected with the other end of said bar to raise and lower the same, a flat tube mounted beneath and to said bar to enter the ground edgewise, a spool carrier supported on said bar in front of said tube, a ground sealer carried by said bar to the rear of said tube, means to open a furrow in the ground in advance of and to receive the rear portion of said tube, said flat tube having a nipple on its upper edge, a tank for fluid carried by the vehicle, and a duct connecting said tank with said nipple to convey fluid from said tank into said flat tube.

7. In a barrier laying machine, a wheeled vehicle, a longitudinally disposed bar pivotally supported at one end by and beneath said vehicle, a control lever on the vehicle operatively connected with the other end of said bar to raise and lower the same, a flat tube mounted beneath and to said bar to enter the ground edgewise, a spool carrier supported on said bar in front of said tube, a ground sealer carried by said bar to the rear of said tube, means to open a furrow in the ground in advance of and to receive the rear portion of said tube, a tank for fluid carried by said vehicle, said flat tube comprising two side-by-side passages of different heights, one for a wide barrier strip and the other for a narrower barrier strip, and said spool carrier comprising means to support two spools, one spool for the wide barrier strip and the other for the narrower barrier strip, said tube having a nipple communicating with one of said passages, a tank for fluid carried by the vehicle, and a duct connecting said tank with said nipple to convey the fluid to the tube.

8. The machine of claim 7 wherein the nipple cooperates with the wider tube-passage.

9. In a barrier laying machine, a wheeled vehicle, a longitudinally disposed element adjustably supported on said vehicle so as to be capable of being raised and lowered with respect to the ground, means to raise and lower said longitudinally disposed element, a flat tube located beneath said element to enter the ground edgewise, arms swivelly connected to said element and to said tube whereby said tube is carried by said element in a manner to permit lateral movement, a ground slitter and spreader device mounted on said vehicle in front of said tube to open the ground to receive said tube, a ground sealer mounted on said element to the rear of said tube, and a spool carrier supported by said element in front of said tube to receive a spool of barrier strip.

10. In a barrier laying machine, a wheeled vehicle, a longitudinally disposed element adjustably supported on said vehicle so as to be capable of being raised and lowered with respect to the ground, means to raise and lower said longitudinally disposed element, a flat tube located beneath said element to enter the ground edgewise, arms swivelly connected to said element and to said tube whereby said tube is carried by said element in a manner to permit lateral movement, a ground slitter and spreader device mounted on said vehicle in front of said tube to open the ground to receive said tube, a ground sealer swivelly and adjustably mounted on said element to the rear of said tube, and a spool carrier supported by said element in front of said tube to receive a spool of barrier strip.

WILLIAM JOHNSON.